United States Patent [19]
Rubinstain et al.

[11] Patent Number: 6,088,368
[45] Date of Patent: Jul. 11, 2000

[54] ETHERNET TRANSPORT FACILITY OVER DIGITAL SUBSCRIBER LINES

[75] Inventors: Avinoam Rubinstain, Maccabim; Yackov Sfadya, Kfar Saba; Shimon Peleg, Hod Hashaon; Noam Alroy, Kadima; Boaz Porat, Haifa, all of Israel

[73] Assignee: 3Com Ltd., Tel Aviv, Israel

[21] Appl. No.: 08/866,831

[22] Filed: May 30, 1997

[51] Int. Cl.[7] .................................................. H04L 12/66
[52] U.S. Cl. .......................... 370/480; 370/206; 370/493; 395/200.63
[58] Field of Search ............................. 375/222; 370/203, 370/204, 206, 480, 482, 484, 486, 487, 490, 493–495, 445, 446; 395/200.63, 200.81

[56] References Cited

U.S. PATENT DOCUMENTS

| | | |
|---|---|---|
| 5,410,343 | 4/1995 | Coddington et al. .......................... 348/7 |
| 5,784,683 | 7/1998 | Sistanizadeh et al. ................... 370/487 |
| 5,790,548 | 8/1998 | Sistanizadeh et al. ................... 370/401 |
| 5,812,786 | 9/1998 | Seazholtz et al. .................. 395/200.63 |

*Primary Examiner*—Chi H. Pham
*Assistant Examiner*—Maikhanh Tran
*Attorney, Agent, or Firm*—David J. Weitz; Wilson Sonsini Goodrich & Rosati

[57] ABSTRACT

The present invention provides a facility transport system for transporting Ethernet over digital subscriber lines. The system, termed 10BaseS, is capable of transmitting 10 Mbps Ethernet over existing copper infrastructure. The system utilizes carrierless amplitude modulation/phase modulation (CAP), a version of suppressed carrier quadrature amplitude modulation (QAM). The 10BaseS transport facility can deliver symmetrical data at approximately 13 Mbps (net 10 Mbps) over the unscreened, twisted pair telephone wires originally intended for bandwidths between 300 Hz and 3.4 KHz. The system utilizes frequency division multiplexing (FDM) to separate downstream channels from upstream channels. FDM is also used to separate both the downstream and upstream channels from POTS signals. The downstream and upstream data channels are separated in frequency from bands used for POTS and ISDN, enabling service providers to overlay 10BaseS on existing services.

15 Claims, 6 Drawing Sheets

ETHERNET TRANSPORT FACILITY OVER DIGITAL SUBSCRIBER LINES

FIELD OF THE INVENTION

The present invention relates generally to telecommunication systems and more particularly relates to a system for transporting Ethernet over digital subscriber lines.

BACKGROUND OF THE INVENTION

There is a growing need among both individuals and enterprises for access a commonly available, cost effective network that provides speedy, reliable services. There is high demand for a high-speed data network, one with enough bandwidth to enable complex two-way communications. Such an application is possible today if, for example, you have access to a university or a corporation with sufficient finances to build this type of network. But for the average home computer user or small business, access to high speed data networks is expensive or simply impossible. Telephone companies are therefore eager to deliver broadband services to meet this current explosion in demand.

One of the problems is that millions of personal computers have found their place in the home market. Today, PCs call be found in approximately 35% of all United States households and a full 50% of United States teenagers own computers. Virtually every PC sold today is equipped with a modem, enabling communication with the outside world via commercial data networks and the Internet. Currently, people use their PCs to send and receive e-mail, to access online services, to participate in electronic commerce and to browse the Internet. The popularity of the Internet is such that there are an estimated 30 million users around the globe. These figures indicate that in the past few years the personal computer has fueled a dramatic increase in data communications and the corresponding demands on the data networks that carry the traffic.

The Internet serves as a good example of the increased demands that have been placed on data networks. At first, Internet access consisted of text only data transfers. Recently, with the popularity of the World Wide Web (WWW) and the development of Internet browsers such as Mosaic, Netscape Navigator or Microsoft Explorer, the use of graphics has surged on the Internet. While graphics make for a much more interesting way to view information as opposed to plain text, bandwidth consumption is significantly more. A simple background picture with accompanying text requires approximately 10 times the bandwidth needed by text alone. Because of the increased requirement for bandwidth, activities such as browsing home pages or downloading graphics files can take a frustratingly long period of time. Considering that the graphics rich World Wide Web accounts for more than one quarter of all Internet traffic, it is easy to see why the demand for bandwidth has outpaced the supply. In addition, the creative community is pushing the envelope by offering audio and full motion video on numerous sites to differentiate themselves from the millions of other sites competing for maximum user hits.

As use of the Internet and online services continues to spread, so does the use of more complex applications, such as interactive video games, telecommuting, business to business communications and videoconferenceing. These complex applications place severe strains on data networks because of the intensive bandwidth required to deliver data-rich transmissions. For example, a telecommuter who requires computer aided design (CAD) software to be transported over the data network requires a high-bandwidth data pipeline because of the significant size of CAD files. Similarly, a business to business transaction in which large database files containing thousand of customer records are exchanged also consumes large amounts of bandwidth. The same is true for users seeking entertainment value from sites offering high quality video and audio. The lack of available bandwidth in today's data networks is the primary barrier preventing many applications from entering mainstream use. Just as processing power limited the effectiveness of early PCs, bandwidth constraints currently limit the capabilities of today's modem user.

Most computer modem users access data through the standard telephone network, known as plain old telephone service (POTS). Equipped with today's speediest modems, dial up modems on a POTS network can access data at a rate of 28.8, 33.6 or 56 Kbps. Dial up modem transmission rates have increased significantly over the last few years, but POTS throughput is ultimately limited to 64 Kbps. While this rate may be acceptable for some limited applications like e-mail, it is a serious bottleneck for more complex transactions, such as telecommuting, videoconferenceing or full-motion video viewing. To illustrate, full motion video compressed, using the Motion Picture Entertainment Group (MPEG)-2 standard requires a data stream of approximately 6 Mbps, or roughly 208 times the throughput of a 28.8 Kbps modem. Thus, using today's dial up modems, it would take more than 17 days to capture two hours of video. As bandwidth demands continue to grow, providers search for better ways to offer high speed data access. Further complicating the problem is the need to deliver all these complex services at an affordable price.

Today's most popular data access method is POTS. But as discussed previously, POTS is limited when it comes to large data transfers. An alternative to POTS currently available is Integrated Services Digital Network (ISDN). In the past few years, ISDN has gained momentum as a high-speed option to POTS. ISDN expands data throughput to 128 Kbps, both from the network to the home and from the home back to the network, and can be technically made available throughout much of the United States. Similar to POTS, ISDN is a dedicated service, meaning that the user has sole access to the line preventing other ISDN users from sharing the same bandwidth. ISDN is considered an affordable alternative, and in general, ISDN is a much better solution for applications such as Web browsing and basic telecommuting. However, like POTS, it severely limits applications such as telecommuting with CAD files and full-motion video viewing. The latter requires roughly 39 times the throughput than that provided by ISDN. Multichannel multipoint distribution service (MMDS), a terrestrial microwave wireless delivery system, and direct broadcast satellite (DBS), such as DirecTv and USSB, are wireless networks. They both deliver high bandwidth data steams to the home, referred to as downstream data, but neither has a return channel through which data is sent back over the network, referred to as upstream data. Although it is a relatively affordable system to deploy for broadcast applications, because it requires no cable wires to be laid, it falls short in interactive access. In order to use a wireless system for something as basic as e-mail, an alternate technology such as a telephone line must be used for the upstream communications.

Another network delivery system is asymmetric digital subscriber line (ADSL). Offering a downstream capacity of 6 Mbps or more to the home, ADSL has the downstream capacity to handle the most complex data transfers, such as full motion video, as well as upstream capacity of at least 500 Kbps. However, due to its limitation of downstream bandwidth capacity, it essentially is a single service platform. Also, since it has to overcome the challenge of reusing several thousand feet of twisted pair wiring, the electronics required at each end of the cable are complex, and therefore currently very expensive.

Hybrid fiber coax (HFC), a network solution offered by telephone and cable companies, is yet another option for delivering high bandwidth to consumers known in the art. However, HFC has limitations. HFC networks provide a downstream capacity of approximately 30 Mbps, which can be shared by up to 500 users. Upstream bandwidth is approximately 5 Mbps and also is shared. A disadvantage with HFC is that shared bandwidth and limited upstream capacity become serious bottlenecks when hundreds of users are sending and receiving data on the network, with service increasingly impaired as each user tries to access the network.

It is a current trend among telephone companies around the world to include existing twisted pair copper loops in their next generation broadband access networks. Hybrid Fiber Coax (HFC), a shared access medium well suited to analog and digital broadcast, comes up short when utilized to carry voice telephony, interactive video and high speed data communications at the same time.

Fiber to the home (FTTH) is still prohibitively expensive in the marketplace which is soon to be driven by competition rather than costs. An alternative is a combination of fiber cables feeding neighborhood Optical Network Units (ONUs) and last leg premises connections by existing or new copper. This topology, which can be called fiber to the neighborhood (FTTN), encompasses fiber to the curb (FTTC) with short drops and fiber to the basement (FTTB), serving tall buildings with vertical drops.

One of the enabling technologies for FTTN is very high rate digital subscriber line (VDSL). VDSL is an emerging standard that is currently undergoing discussion in ANSI and ETSI committees. The system transmits high speed data over short reaches of twisted pair copper telephone lines, with a range of speeds depending upon actual line length.

SUMMARY OF THE INVENTION

The present invention provides a facility transport system for transporting Ethernet over digital subscriber lines. The system, termed 10BaseS, is capable of transmitting of 10 Mbps Ethernet over existing copper infrastructure. The system utilizes carrierless amplitude modulation/phase modulation (CAP), a version of suppressed carrier quadrature amplitude modulation (QAM). The 10BaseS transport facility can deliver symmetrical data at approximately 13 Mbps (net 10 Mbps) over the unscreened, twisted pair telephone wires originally intended for bandwidths of between 300 Hz and 3.4 KHz. The system utilizes frequency division multiplexing (FDM) to separate downstream channels from upstream channels. FDM is also used to separate both the downstream and the upstream channels from POTS signals. The downstream and upstream data channels are separated in frequency from bands used for POTS and ISDN, enabling service providers to overlay 10BaseS on existing services.

The 10BaseS system has applications in the small office/home office (SOHO) market and can be installed in industrial areas or business districts where most of the copper infrastructure is of shorter distances. The small office/home office market has greatly developed in recent years and is eagerly waiting for LAN extension solutions. The need for connecting between several buildings of the same company or between headquarters to branches, dictates either using a leased line such as T1/T3 which is very expensive or a POTS/ISDN modem which is very slow. The 10BaseS system of the present invention can be applied to these markets while achieving better price performance for both the telephone company and the end user.

There is therefore provided in accordance with the present invention a point to point facility transport system for the transport of Ethernet frame data over a copper infrastructure connecting a central office facility to a customer premise, comprising a downstream transmission path for transporting Ethernet frame data transmitted from the central office facility destined to the customer premise, an upstream transmission path for transporting Ethernet frame data transmitted from the customer premise destined to the central office facility, first modem means located at the central office facility and coupled to one end of the downstream transmission path and one end of the upstream transmission path, second modem means located at the customer premises and coupled to the other end of the downstream transmission path and the other end of the upstream transmission path, and wherein the first modem means and the second modem means are operative to place onto and receive from the copper infrastructure data frames encapsulating the Ethernet frame data.

Further, the downstream transmission path utilizes carrierless amplitude modulation phase modulation/quadrature amplitude modulation (CAP/QAM) to transport the Ethernet frame data from the central office facility to the customer premise and the upstream transmission path utilizes carrierless amplitude modulation phase modulation/quadrature amplitude modulation (CAP/QAM) to transport the Ethernet frame data from the customer premise to the central office facility.

In addition, the first modem means and the second modem means further comprise transmitter means for coupling to the copper infrastructure, the transmitter means operative to encapsulate received Ethernet frame data into data frames and to generate a transmit signal therefrom suitable for transmission onto the copper infrastructure, and receiver means for coupling to the copper infrastructure, the receiver means operative to de-encapsulate received data frames into Ethernet frame data and to generate a receive data signal therefrom There is also provided in accordance with the present invention a point to point facility transport system for the transport of Ethernet frame data and plain old telephone service (POTS) over a copper infrastructure connecting a central office facility to a customer premise, comprising a downstream transmission path for transporting Ethernet frame data and POTS transmitted from the central office facility destined to the customer premise, an upstream transmission path for transporting Ethernet frame data and POTS transmitted from the customer premise destined to the central office facility, first modem means located at the central office facility and coupled to one end of the downstream transmission path and one end of the upstream transmission path, second modem means located at the customer premises and coupled to the other end of the downstream transmission path and the other end of the upstream transmission path, first splitter means coupled to the first modem means and to the copper infrastructure, second splitter means coupled to the second modem means and to the copper infrastructure, wherein the first modem means and the second modem means are operative to place onto and receive from the copper infrastructure data packets encapsulating the Ethernet frame data, wherein the first splitter means and the second splitter means are operative to combine and split the POTS and downstream and upstream transmission path signals.

In addition, there is provided in accordance with the present invention a point to point facility transport system for the transport of Ethernet frame data over a copper infrastructure connecting a central office facility to a customer premise, comprising a downstream transmission path for transporting Ethernet frame data transmitted from the central office facility destined to the customer premise, an upstream transmission path for transporting Ethernet frame data transmitted from the customer premise destined to the central office facility, switch means located at the central office facility and coupled to one end of the downstream transmission path and one end of the upstream transmission path, a network element located at the customer premises and coupled to the other end of the downstream transmission path and the other end of the upstream transmission path, wherein the switch means and the network element are operative to place onto and receive from the copper infrastructure data frames encapsulating the Ethernet frame data. Further, the network element may comprise a modem or a customer premise switch.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
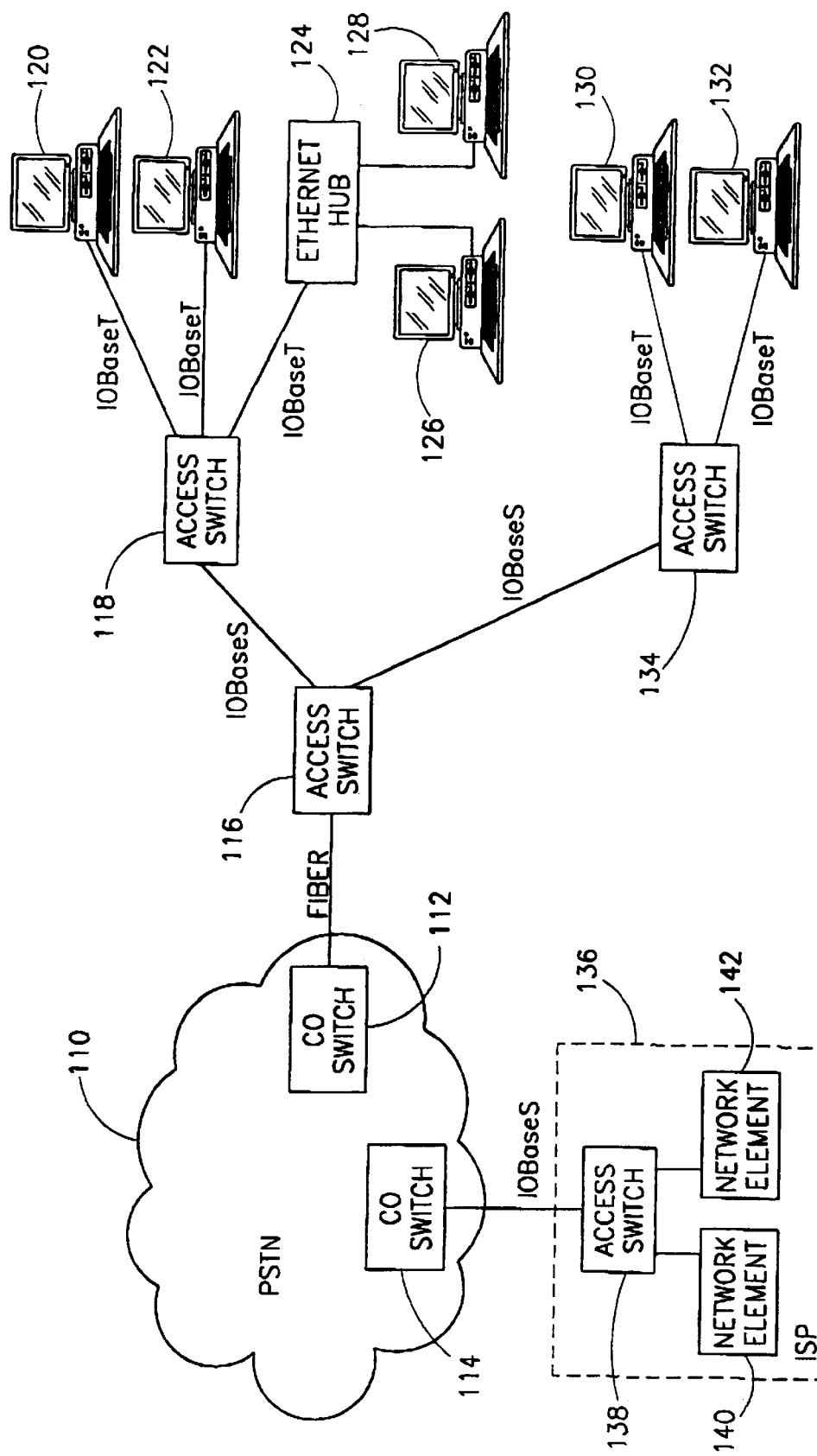
FIG. 1 is a high level block diagram illustrating the 10BaseS transport facility of the present invention as applied to a sample telephony application.

The following notation is used throughout this document.

| Term | Definition |
| --- | --- |
| ADSL | Asymmetric Digital Subscriber Line |
| AGC | Automatic Gain Control |
| ANSI | American National Standards Institute |
| BER | Bit Error Rate |
| CAD | Computer Aided Design |
| CAP | Carrierless Amplitude Modulation/Phase Modulation |
| DBS | Direct Broadcast Satellite |
| ETSI | European Telecommunications Standards Institute |
| FDM | Frequency Division Multiplexing |
| FEC | Forward Error Correction |
| FEXT | Far End Crosstalk |
| FIFO | First In First Out |
| FTTB | Fiber to the Building |

-continued

| Term | Definition |
| --- | --- |
| FTTC | Fiber to the Curb |
| FTTCab | Fiber to the Cabinet |
| FTTEx | Fiber to the Exchange |
| FTTH | Fiber to the Home |
| FTTN | Fiber to the Node |
| HFC | Hybrid Fiber Coax |
| ISDN | Integrated Services Digital Network |
| ISP | Internet Service Provider |
| LAN | Local Area Network |
| MMDS | Multichannel Multipoint Distribution Service |
| MPEG | Motion Picture Entertainment Group |
| NEXT | Near End Crosstalk |
| NIC | Network Interface Card |
| NTP | Network Termination Point |
| ONU | Optical Network Unit |
| PBX | Private Branch Exchange |
| PC | Personal Computer |
| PLL | Phase Lock Loop |
| POTS | Plain Old Telephone Service |
| PSD | Power Spectral Density |
| QAM | Quadrature Amplitude Modulation |
| QoS | Quality of Service |
| RFI | Radio Frequency Interference |
| SNMP | Simple Network Management Protocol |
| SNR | Signal to Noise Ratio |
| SOHO | Small Office/Home Office |
| TDMA | Time Division Multiple Access |
| VCXO | Voltage Controlled Crystal Oscillator |
| VDSL | Very High Speed Digital Subscriber Line |
| WAN | Wide Area Network |
| WWW | World Wide Web |

General Description

The present invention is a facility transport system for transporting Ethernet over digital subscriber lines. The system is referred as 10BaseS and is capable of transmitting of 10 Mbps Ethernet over existing copper infrastructure. The system utilizes carrierless amplitude modulation/phase modulation (CAP) which is a version of suppressed carrier quadrature amplitude modulation (QAM). QAM is the most commonly used form of high speed modulation over voice telephone lines. The system also utilizes frequency division multiplexing (FDM) to separate downstream channels from upstream channels. In addition, FDM is also used to separate both the downstream and the upstream channels from POTS and ISDN signals. A substantial distance in frequency is maintained between the lowest data channel and POTS frequencies to permit the use of very simple and cost effective POTS splitters, which are actually splitters/combiners. The upstream channel is placed above the downstream channel in frequency. The downstream and upstream data channels are separated in frequency from bands used for POTS and ISDN, enabling service providers to overlay 10BaseS on existing services.

The 10BaseS system of the present invention combines copper access transmission technology of Ethernet based services with Quality of Service (QoS) guaranteed by the SRVP protocol and is capable of being fully managed through an SNMP agent. The 10BaseS transport facility can deliver symmetrical data at 12.96 Mbps (net 10 Mbps) over the unscreened, twisted pair telephone wires originally intended for bandwidths of between 300 Hz and 3.4 KHz. The invention uses QAM modulation and blind equalization to achieve a high transmission speed over existing copper infrastructure. In addition, the system is able to cope with several sources of noise such as impulse noise, e.g., POTS transients, radio frequency interference (RFI) noise and crosstalk noise, i.e., both near end crosstalk (NEXT) and far end crosstalk (FEXT). In terms of RF emissions, the system can operate using underground cabling as well as overhead distribution cabling.

Both the LAN, i.e., Ethernet frames, and POTS services, i.e., voice, may be transmitted over a common optical access network before final distribution over a copper distribution network. Alternatively, in the case where LAN services are provided by an overlay network, an Optical Network Unit (ONU) is co-located with an existing copper network distribution point where the LAN and POTS services are combined for transmission over the existing copper distribution network.

In one installation application of the invention, 10BaseS transmission would be used on shorter exchange lines when the switch or ONU is located in a serving exchange building.

The switch or ONU may be sited in different locations forming different architectures for a hybrid optical network. Some of these architectures include: fiber to the cabinet (FTTCab), fiber to the curb (FTTC), fiber to the node (FTTN), fiber to the building (FTTB) and fiber to the exchange (FTTEx).

The 10BaseS transport facility of the present invention supports both LAN and POTS services sharing the same copper distribution cable. The POTS and the LAN services are separated close to the point where the combined signals enter the customer premises. This is achieved by a POTS splitter filter, i.e., splitter/combiner filter, which may or may not be part of the network termination (NT). The 10BaseS system is a point to point transmission system even though the core modem is a blind modem which is able to support point to multipoint communications. The network termination interface at the customer premises can be the widely used 10BaseT RJ-45 or 10Base2 BNC interface. The customer can hook up any common 10BaseT or 10Base2 equipment, such as an Ethernet switch or hub, or any product that has an Ethernet network interface card (NIC). The network interface unit will respond to test and management messages originated by any SNMP network management system.

The system supports two latency modes that can be modified by software or through the network management: with an interleaver resulting in a latency of less than 100 msec; without an interleaver resulting in a latency of less than 1.5 msec.

10BaseS Applications

A high level block diagram illustrating the 10BaseS transport facility of the present invention as applied to a sample telephony application is shown in FIG. 1. The public switched telephone network (PSTN) 110 is shown with one central office (CO) switch 114 coupled to Internet service provider (ISP) 136. The ISP comprises an access switch 138 which is shown coupled to two network elements 140, 142. Another central office switch 112 is shown connected by a fiber link to the access switch 116.

The access switch 116 is shown connected to two access switches 118, 134 via 10BaseS connections. The two access switches 118, 134 represent edge devices for two separate customer premises. The access switch 118 is shown connected to computer work stations 120, 122 and to an Ethernet hub 124. The Ethernet hub, in turn, is connected to two computer work stations 126, 128. Data communications between the access switch and the computer work stations and the Ethernet hub are carried over 10BaseT links. The access switch 134 is shown coupled to computer work stations 130, 132. Communications between the computer access switch and the computer work stations are occur over 10BaseT links.

It is important to note that the network comprising computer work stations and the Ethernet hub shown connected to the access switch in the example in FIG. 1 is for illustrative purposes only. One skilled in the art can assemble numerous other configurations without departing from the spirit of the invention. The access switch of the present invention can be coupled to any device able to communicate using 10BaseT or 10Base2.

Each of the access switches comprise 10BaseS modems that communicate with each other using the 10BaseS modulation and protocol scheme disclosed herein. The modems, including the transmitter and receiver portions, incorporated in the access switches are described in more detail hereinbelow.

Figure 2:
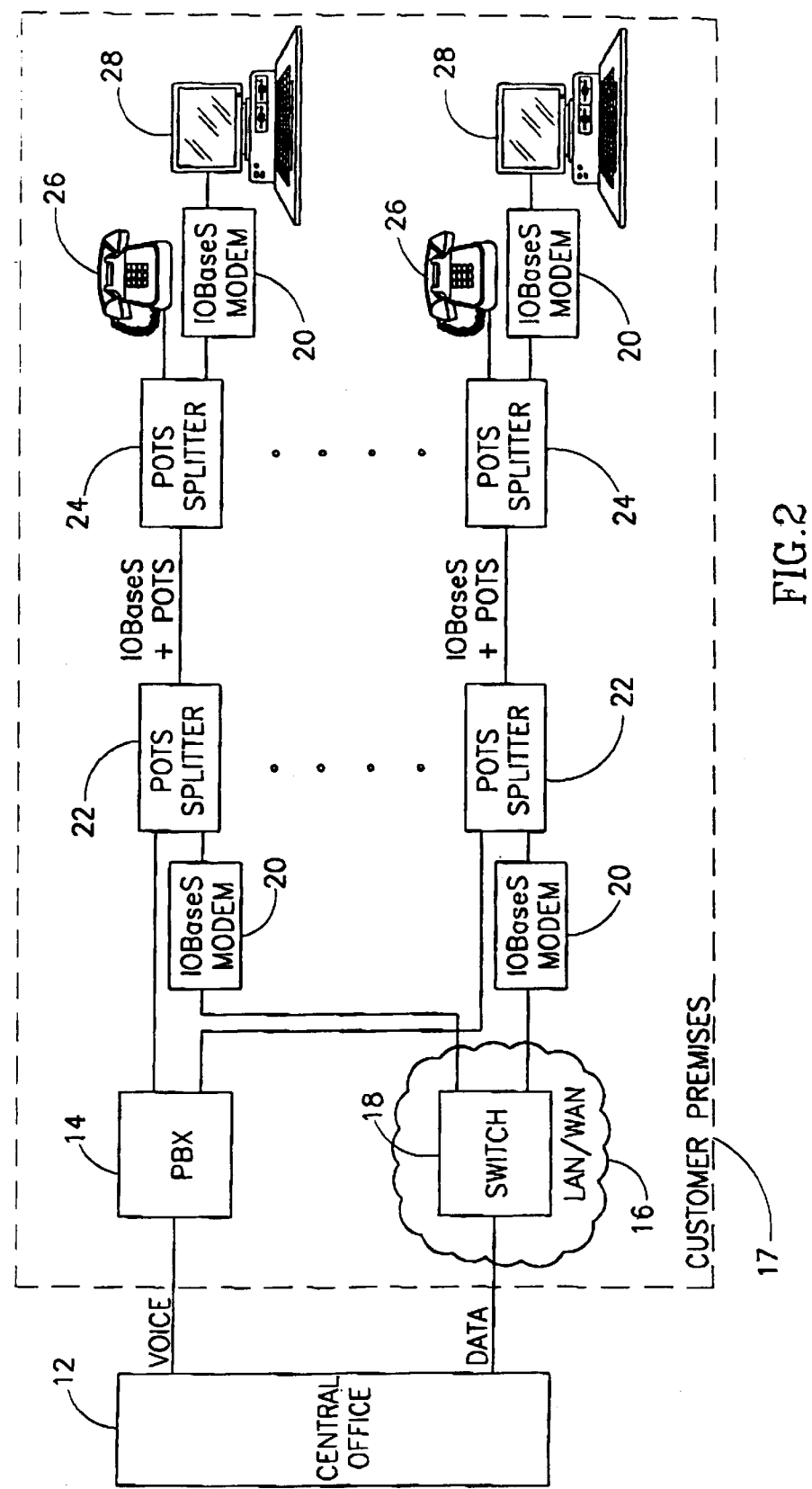
FIG. 2 is a high level block diagram illustrating a sample customer premises network utilizing the 10BaseS transport facility of the present invention.

A high level block diagram illustrating a sample customer premises network utilizing the 10BaseS transport facility of the present invention is shown in FIG. 2. This figure shows a central office 12 coupled to a private branch exchange (PBX) 14 and a LAN/WAN 16. The connection between the central office and the PBX carries voice traffic and the connection between the central office and the switch 18 within the LAN/WAN carries data traffic. Both the PBX and LAN/WAN are located on the customer premises 17.

The PBX is coupled to a plurality of POTS splitters 22 which function to combine the 10BaseS transmission signal with the POTS voice signal. The LAN/WAN is shown comprising at least a switch 18, for example, which is coupled to the POTS splitters via 10BaseS modems 20. The LAN/WAN can comprise any combination of networking equipment. The LAN/WAN is connected to the 10BaseS modem via a 10BaseT connection. Note that throughout this document, the term POTS splitter implies a device that functions to both split and combine the 10BaseS and POTS signals.

POTS splitters 22 communicate to POTS splitters 24 which are typically physically located in remote locations in different areas of the customer premises. For example, the customer premises may be a large university campus with communication links spanning out to each building within the campus. The communication links would carry a combination of 10BaseS and POTS traffic. With reference to FIG. 2, the links between the POTS splitters 22 and 24 carry a combined 10BaseS transmission signal in addition to the POTS voice signal. The PBX and the network equipment would typically be installed in the telecommunications equipment room which also serves as the service entrance or network termination point (NTP) to the telco lines from the central office.

In the Figure, each of the POTS splitters 24 are connected to telephone voice terminals 26 and 10BaseS modems 20. Any 10BaseT capable device such as computer work stations 28 can be connected to 10BaseS modems 20.

Figure 3:
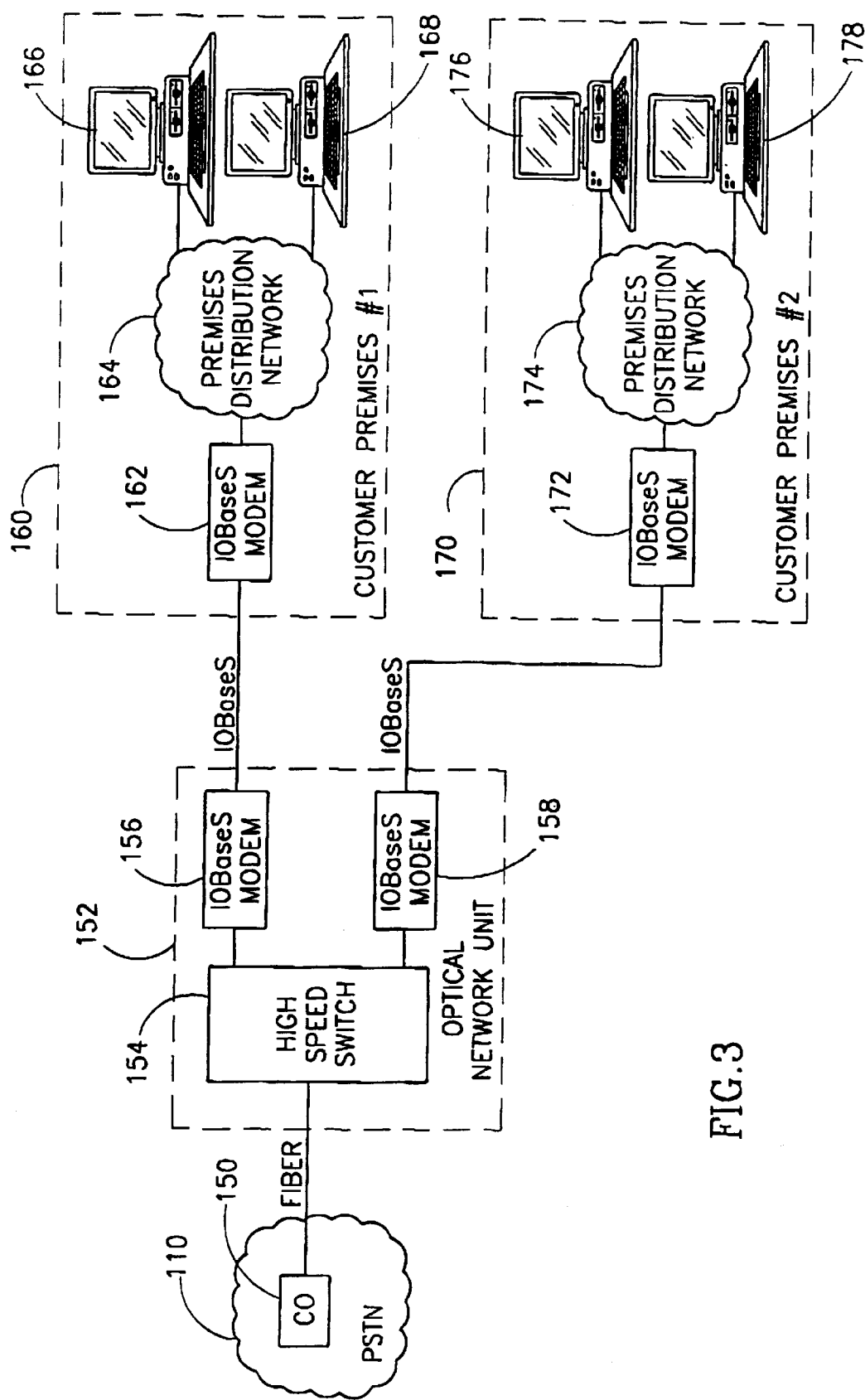
FIG. 3 is a high level block illustrating an optical network unit connected to multiple customer premises via the 10BaseS transport facility.

A high level block diagram illustrating an optical network unit connected to multiple customer premises via the 10BaseS transport facility of the present invention is shown in FIG. 3. An example central office 150 within the PSTN 110 is shown coupled to an optical network unit (ONU) 152. The fiber is terminated on a high speed switch 154 which comprises a plurality of 10BaseT ports. 10BaseS modems 156, 158 are shown coupled via 10BaseT to the high speed switch 154. The 10BaseS modem 156 is coupled to 10BaseS modem 162 within customer premises #1 160. The 10BaseS modem 162, in turn, is connected to the premises distribution network 164. The premises distribution network represents any 10BaseT or 10Base2 capable network. Shown coupled to the premises distribution network are computer work stations 166, 168.

Similarly, 10BaseS modem 158 is connected to 10BaseS modem 172 located in customer premises #2 170. 10BaseS modem 172 is connected to the premises distribution network 174. Here too, the premises distribution network 174 represents any 10BaseT or 10Base2 capable network. Computer work stations 174, 178 are shown connected via 10BaseT to the premises distribution network.

Modem Transmitter

Figure 4:
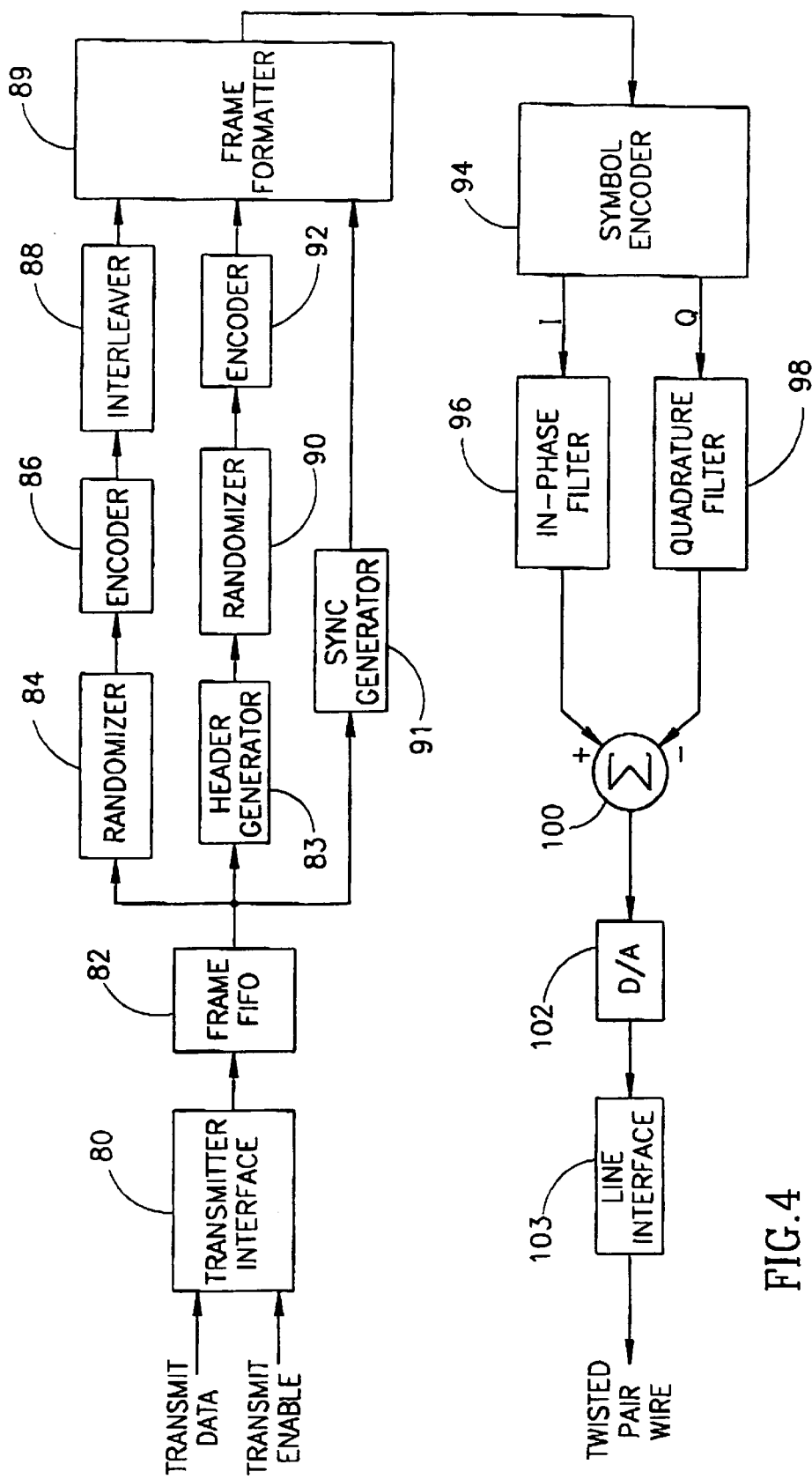
FIG. 4 is a high level block diagram illustrating the transmit portion of the 10BaseS modem of the present invention.

A high level block diagram illustrating the transmit portion of the 10BaseS modem of the present invention is shown in FIG. 4. The data source feeding the modem supplies a transmit data signal and a transmit enable signal to the transmitter interface 80 of the 10BaseS modem. The transmit interface inputs digital data to the frame first in first out (FIFO) 82. The FIFO functions to adjust the rate of data flow between data source and the modem itself. The FIFO compensates for differences in the data rates between the two devices. The output of the FIFO is input to a sync generator 91, header generator 89 and the randomizer 84. The sync generator functions to generate and output two sync bytes to the frame formatter 89. Preferably, the two sync bytes are F6H and 28H. The header generator functions to generate header information typically spanning a plurality of bytes. The header itself is then randomized or scrambled by randomizer 90 and subsequently encoded by encoder 92. The output of the encode is input to the frame formatter 89.

The data from the frame FIFO is input to the scrambler or randomizer 84 which functions to scramble the data. The output of the randomizer is input to the encoder 86 which functions to encode the data stream. The output of the encoder is input to the interleaver 88 which, in combination with Reed Solomon encoding used in the transmitter and the receiver, functions to shuffle the data to help overcome impulse type noise thus resulting in improved error recovery. The output of the interleaver is input to the frame formatter 89.

The frame formatter functions to assemble a complete frame comprising the sync, header and data stream output form the interleaver. The output of the frame formatter is input to the symbol encoder 94 which functions to generate the in band I and quadrature Q digital output signals from the input digital data stream. The I and Q channels are input to an in phase filter 96 and a quadrature filter 98, respectively. The output of the quadrature filter is subtracted from the output of the in band filter via a digital summer or adder 100. The output of the summer is converted to analog via D/A converter 102. The analog output signal is input to the line interface unit 103 which places the output signal from the transmitter onto the twisted pair wire.

Modem Receiver

Figure 5A:
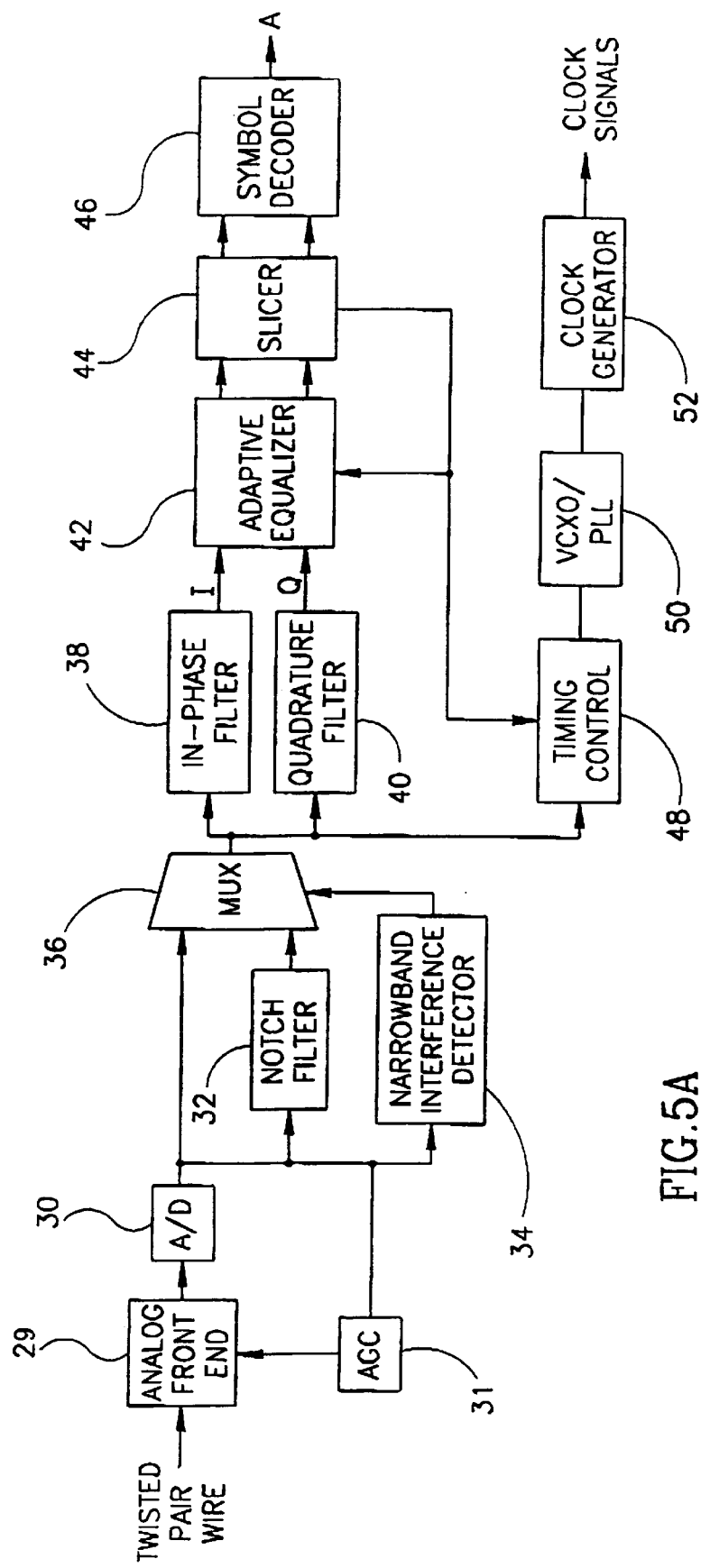
FIGS. 5A and 5B are high level block diagrams illustrating the receive portion of the 10BaseS modem of the present invention.
Figure 5B:
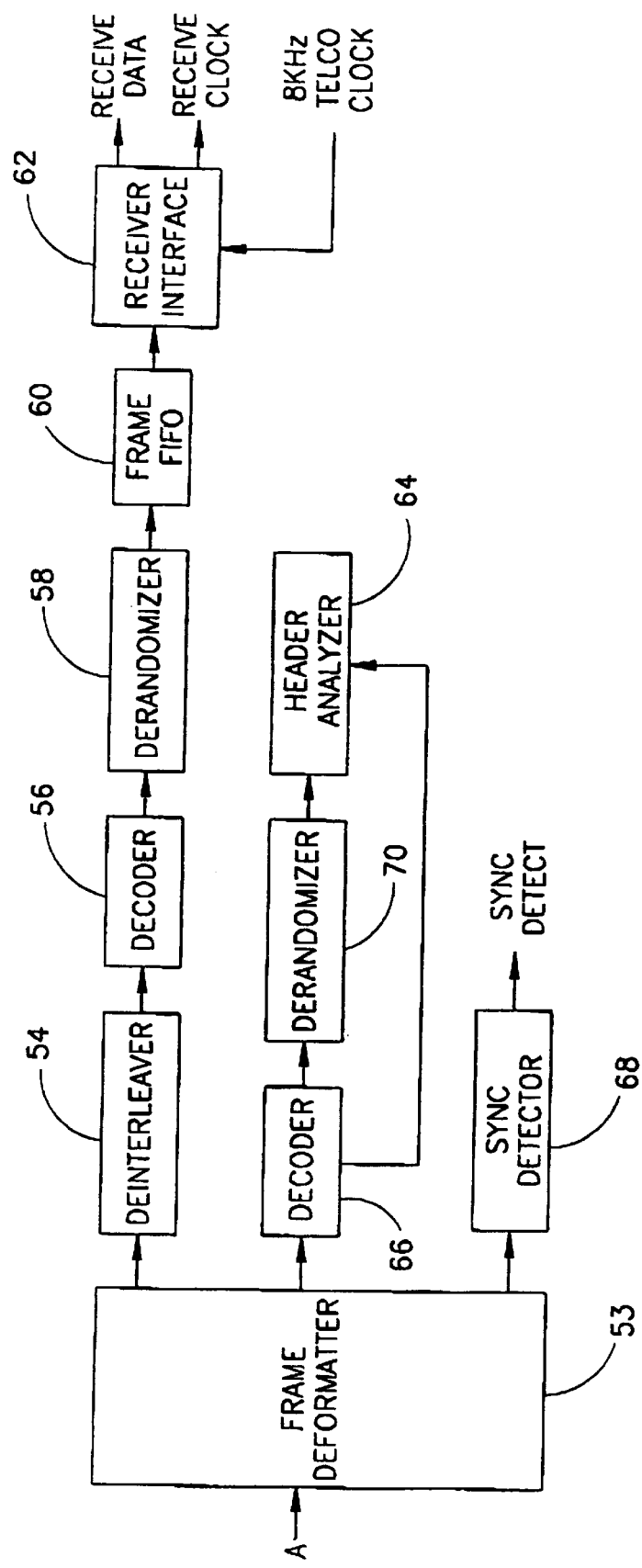

High level block diagrams illustrating the receive portion of the 10BaseS modem of the present invention are shown in FIGS. 5A and 5B. The twisted pair wire is coupled to an analog front end 29 which functions to interface the 10BaseS modem to the wire and to amplify the received analog signal. The output of the analog front end is converted to digital via A/D converter 30. The output of the A/D converter is input to an automatic gain control (AGC) circuit 31. The output of the A/D converter is also coupled to a multiplexer (mux) 36, notch filter 32 and a narrowband interference detector 34. The output of the notch filter 32 is connected to the second input of the mux 36. The narrowband interference detector functions to detect the presence of amateur radio signal which lie in the frequency range of 1.8 to 2 MHz. If sufficient signal levels in the amateur radio band are detected in the received signal, the mux is set to switch the output the notch filter to its output. The center frequency and the bandwidth of the notch filter is set to cover the amateur radio band.

The output of the mux 36 is input to an in phase filter 38, a quadrature filter 40 and a timing control circuitry 48. The I and Q signals, output of the in phase and quadrature filters, respectively, are input to the adaptive equalizer 42. The I and Q outputs of the adaptive equalizer are input to the slicer 44, The slicer generates a feedback signal to control the adaptive equalizer and the timing control circuitry. The timing control circuitry outputs a signal to the voltage controlled crystal oscillator (VCXO)/phase lock loop (PLL) 50. The output of the PLL is input to clock generating circuitry which functions to produce the clock signals used internally by the modem.

The I and Q outputs of the slicer are input to the symbol decoder 46 which functions to make a best determination from among the constellation points according to the I and Q input signals. The bits representing the symbol are output by the symbol decoder and input to the frame deformatter 53. The frame deformatter is coupled to the deinterleaver 54, decoder 66 and the sync detector 68. The sync detector functions to match the sync pattern and hunt for multiple sync occurrences in the input data stream. Once a sync is detected, the header data is read from the frame by the frame deformatter and input to the decoder 66. The output of the decoder is input to the derandomizer 70. The output of the decoder and the derandomizer are input to the header analyzer 64. The header is analyzed to detect missing frames, perform addressing functions, etc.

The frame deformatter also output a data stream to the deinterleaver 54 which functions to deshuffle the data. The output of the deinterleaver is input to the decoder 56. The output of the decoder is input to the derandomizer 58 which functions to descramble the data. The output of the derandomizer is input to the frame FIFO 60 which adjusts for the difference in data rates between the modem and the communication device connected to it. The output of the frame FIFO is input to the receive interface 62 which outputs a receive data signal. A receive clock generated by the data device connected to the modem is input to the receive interface and functions to provide the clocking signal for the receive data.

Modulation Characteristics

The modulation characteristics of the 10BaseS system of the present invention will now be described in more detail. The 10BaseS system can transmit at full duplex on a single category-3 (CAT-3) twisted pair wire, utilizing frequency division multiplexing (FDM). The system supports two basic rates: a full rate and a half rate. The full rate transmits at 13 Mbps in each direction simultaneously. The payload rate, after accounting for forward error correction (FEC) and control overhead is 10 Mbps. The half rate transmits at 6.5 Mbps in each direction simultaneously. The payload rate, after accounting for FEC and control overhead is 5 Mbps.

The system utilizes carrierless amplitude and phase/quadrature amplitude modulation (CAP/QAM), with a square root raised cosine shaping filter at the transmitter and a matched filter at the receiver. The roll-off factor of the square root raised cosine filter is 0.2. The downstream channel utilizes CAP/QAM-256, providing a spectral efficiently of 8 bits/symbol. The upstream channel utilizes CAP/QAM-16, providing a spectral efficiency of 4 bits/ symbol. The following table lists the various rates and bandwidths for the downstream and upstream channels.

| Rate | Channel Direction | Bandwidth |
|---|---|---|
| Full | Downstream | 1.95 MHz |
| Full | Upstream | 3.9 MHz |
| Half | Downstream | 0.975 MHz |
| Half | Upstream | 1.95 MHz |

The upstream channel uses CAP/QAM-16 with less bits per symbol than the modulation used for the downstream channel due to the attenuation of the telephone line at higher frequencies. The upstream channel band is placed at a higher frequency than the downstream channel. Thus, the bandwidth of the upstream channel is necessarily higher in order to achieve the same data rate.

The transmitted power output by the system onto the twisted pair wire is preferably limited to 10 dBm (10 mW) in each direction. This power limit is widely incorporated into existing standards such as ANSI and ETSI. The transmit power is limited in order to limit the power spectral density (PSD) on the wire. The downstream power is thus fixed but the power transmitted on the upstream direction is controlled by the downstream link in accordance with the length of the wire so as to maintain the received power in the upstream direction at a constant level. Transmit power control is necessary in order to prevent excessive far end crosstalk to other upstream channels.

The sampling rates of the D/A in the transmitter and of the A/D in the receiver are listed in the table presented below.

| Rate | Channel Direction | Sampling Rate |
|---|---|---|
| Full | Down | 6.5 MHz (4 samples/symbol) |
| Full | Up | 19.5 MHz (6 samples/symbol) |
| Half | Down | 3.25 MHz (4 samples/symbol) |
| Half | Up | 9.75 MHz (6 samples/symbol) |

The performance of the system is affected by several noise sources. One of these noise sources is far-end cross talk (FEXT). The noise introduced by the FEXT can be described by the following expression.

$$N_{FEXT}(f) = 9 \times 10^{-20} \left(\frac{M}{49}\right)^{0.6} d f^2 S_R(f)$$

where M is the number of disturbers, i.e., the number of wire pairs in the same binder, d is the length of the wire in feet, f is the frequency in Hz and $S_R(f)$ is the power spectral density (PSD) of the received signal. The PSD of the received signal can be expressed as the following $$S_R(f) = S_T(f) \cdot |H(f)|^2$$

where $S_T(f)$ is the PSD of the transmitted signal and H(f) is the frequency response or the transfer function of the twisted pair at the specified wire length.

Another type of noise is near-end crosstalk (NEXT). The system, however, does not generate near end cross talk because there is no overlap in frequency between the upstream frequency band and the downstream frequency bands in the same binder.

Yet another source of noise that can affect system performance is thermal noise. Typical thermal noise $N_0$ in the system is at a one sided power level of −140 dBm/Hz.

The system is operative to support multiple maximum wire lengths. The following table lists the various rates, wire gauges and wire lengths.

| Rate | Gauge | Length |
|---|---|---|
| Full | 24 gauge (0.5 mm) | 1,200 m (4,000 ft) |
| Full | 26 gauge (0.4 mm) | 1,000 m (3,300 ft) |
| Half | 24 gauge (0.5 mm) | 1,800 m (6,000 ft) |
| Half | 26 gauge (0.4 mm) | 1,400 m (4,600 ft) |

After FEC, the bit error rate (BER) is $10^{-9}$ or less. As described below, the performance specified above is achieved with a 6 dB margin for all noise sources. The maximum ranges listed in the table above are supported by the mathematical calculations presented below.

The capacity and range of the system will now be described in more detail. The theoretical upper limit on the number of bits per second, i.e., capacity, of a transmission channel is given by the well know Shannon formula $$C = \int_{f_{min}}^{f_{max}} \log_2\left[1 + \frac{S_R(f)}{N(f)}\right] df$$

where $f_{min}$ and $f_{max}$ are the lower and upper frequencies of the channel, $S_R(f)$ is the power spectral density of the received signal and N(f) is the power spectral density of the noise. The power spectral density of the noise is given by $$N(f) = N_{FEXT}(f) + N_0$$

The power spectral density of the received signal is as given above $$S_R(f) = S_T(f) \cdot |H(f)|^2$$

where $S_T(f)$ is the power spectral density of the transmitted signal. The transmitted signal is a raised cosine with a bandwidth excess of 20% and total power of 10 dBm. H(f) is the frequency response or the transfer function of the twisted pair at the specified wire length. Since it preferable to have a 6 dB margin in system performance, the Shannon capacity formula is utilized with an artificial factor of 0.25, i.e., 0.25·S(f) is used rather than S(f).

The full channel capacity cannot be achieved with CAP/QAM modulation, but trellis coding can be used to get close to the full capacity. Without trellis coding, CAP/QAM modulation can achieve 50% or more of the capacity using sufficiently rich constellations. As a rule of thumb, CAP/QAM modulation with L constellation points can be used to transmit approximately $\log_2 L$ bits/symbol at a BER or $10^{-5}$, before forward error correction, if the following expression is satisfied for the signal to noise ratio (SNR)

$$SNR \geq 6 + 3\log_2 L \ dB$$

The SNR can be defined as $$SNR = \frac{1}{f_{max} - f_{min}} \frac{\int_{f_{min}}^{f_{max}} S_R(f) df}{\int_{f_{min}}^{f_{max}} N(f) df}$$

In the system of the present invention CAP/QAM-256 can be utilized if the SNR of the channel is at least 30 dB. CAP/QAM-16 can be utilized if the SNR of the channel is at least 18 dB. However, a 6 dB noise margin is preferably added to these numbers to yield a threshold of 36 dB for CAP/QAM-256 and a threshold of 24 dB for CAP/QAM-16.

The capacity and SNR for the downstream and upstream channels, at full and half rates and for wire gauges of 24 and 26 are listed in the table presented below.

| Rate | Channel Direction | Minimum Frequency | Maximum Frequency | Net Rate | SNR |
|---|---|---|---|---|---|
| Full | Down | 0.2 MHz | 2.15 MHz | 10 Mbps | 41 dB |
| Full | Up | 2.15 MHz | 6.05 MHz | 10 Mbps | 25 dB |
| Half | Down | 0.2 MHz | 1.175 MHz | 10 Mbps | 42 dB |
| Half | Up | 1.175 MHz | 3.125 MHz | 10 Mbps | 30 dB |

As can be seen from this table, the SNR is always greater than the required threshold for the CAP/QAM constellation.

While the invention has been described with respect to a limited number of embodiments, it will be appreciated that many variations, modifications and other applications of the invention may be made.

What is claimed is:

1. A point to point facility transport system for the transport of Ethernet frame data over a copper infrastructure connecting a central office facility to a customer premise, comprising:

a downstream transmission path for transporting Ethernet frame data transmitted from the central office facility destined to the customer premise, said downstream transmission path operative to simultaneously carry both voice and Ethernet data signals;

an upstream transmission path for transporting Ethernet frame data transmitted from the customer premise destined to the central office facility, said upstream transmission path operative to simultaneously carry both voice and Ethernet data signals;

said downstream transmission path and said upstream transmission path being symmetrical in data transmission capacity, the Ethernet transmission capacity of said downstream transmission path being substantially the same as the Ethernet transmission capacity of said upstream transmission path;

first modem means located at the central office facility and coupled to one end of said downstream transmission path and one end of said upstream transmission path;

second modem means located at the customer premise and coupled to the other end of said downstream transmission path and the other end of said upstream transmission path; and wherein said first modem means and said second modem means are operative to place onto and receive from the copper infrastructure data frames encapsulating said Ethernet frame data.

2. The facility transport system according to claim 1, wherein said downstream transmission path utilizes carrierless amplitude modulation phase modulation/quadrature amplitude modulation (CAP/QAM) to transport said Ethernet frame data from said central office facility to said customer premise.

3. The facility transport system according to claim 1, wherein said upstream transmission path utilizes carrierless amplitude modulation phase modulation/quadrature amplitude modulation (CAP/QAM) to transport said Ethernet frame data from said customer premise to said central office facility.

4. The facility transport system according to claim 1, wherein said first modem means and said second modem means further comprise:

transmitter means for coupling to said copper infrastructure, said transmitter means is operative to encapsulate received Ethernet frame data into data frames and to generate a transmit signal therefrom suitable for transmission onto said copper infrastructure; and receiver means for coupling to said copper infrastructure, said receiver means is operative to de-encapsulate received data frames into Ethernet frame data and to generate a receive data signal therefrom.

5. A point to point facility transport system for the transport of Ethernet frame data and plain old telephone service (POTS) over a copper infrastructure connecting a central office facility to a customer premise, comprising:

a downstream transmission path for transporting Ethernet frame data and POTS transmitted from the central office facility destined to the customer premise;

an upstream transmission path for transporting Ethernet frame data and POTS transmitted from the customer premise destined to the central office facility;

said downstream transmission path and said upstream transmission path being symmetrical in data transmissions capacity, the Ethernet transmission capacity of said downstream transmission path being substantially the same as the Ethernet transmission capacity of said upstream transmission path;

first modem means located at the central office facility and coupled to one end of said downstream transmission path and one end of said upstream transmission path;

second modem means located at the customer premise and coupled to the other end of said downstream transmission path and the other end of said upstream transmission path;

first splitter means coupled to said first modem means and to said copper infrastructure, said first splitter means for combining and splitting Ethernet data signals with voice POTS voice signals;

second splitter means coupled to said second modem means and to said copper infrastructure, said second splitter means for combining and splitting Ethernet data signals with voice POTS voice signals;

wherein said first modem means and said second modem means are operative to place onto and receive from the copper infrastructure data packets encapsulating said Ethernet frame data.

6. The facility transport system according to claim 5, wherein said downstream transmission path utilizes carrierless amplitude modulation phase modulation/quadrature amplitude modulation (CAP/QAM) to transport said Ethernet frame data from said central office facility to said customer premise.

7. The facility transport system according to claim 5, wherein said upstream transmission path utilizes carrierless amplitude modulation phase modulation/quadrature amplitude modulation (CAP/QAM) to transport said Ethernet frame data from said customer premise to said central office facility.

8. The facility transport system according to claim 5, wherein said first modem means and said second modem means further comprise:

transmitter for coupling to said copper infrastructure, said transmitter means is operative to encapsulate received Ethernet frame data into data frames and to generate a transmit signal therefrom suitable for transmission onto said copper infrastructure; and receiver means for coupling to said copper infrastructure, said receiver means is operative to de-encapsulate received data frames into Ethernet frame data and to generate a receive data signal therefrom.

9. A point to point facility transport system for the transport of Ethernet frame data over a copper infrastructure connecting a central office facility to a customer premise, comprising:

a downstream transmission path for transporting Ethernet frame data transmitted from the central office facility destined to the customer premise, said downstream transmission path operative to simultaneously carry both voice and Ethernet data signals;

an upstream transmission path for transporting Ethernet frame data transmitted from the customer premise destined to the central office facility, said upstream transmission path operative to simultaneously carry both voice and Ethernet data signals;

said downstream transmission path and said upstream transmission path being symmetrical in data transmission capacity, the Ethernet transmission capacity of said downstream transmission path being substantially the same as the Ethernet transmission capacity of said upstream transmission path;

switch means located at the central office facility and coupled to one end of said downstream transmission path and one end of said upstream transmission path;

a network element located at the customer premise and coupled to the other end of said downstream transmission path and the other end of said upstream transmission path;

wherein said switch means and said network element are operative to place onto and receive from the copper infrastructure data frames encapsulating said Ethernet frame data.

10. The facility transport system according to claim 9, wherein said downstream transmission path utilizes carrierless amplitude modulation phase modulation/quadrature amplitude modulation (CAP/QAM) to transport said Ethernet frame data from said central office facility to said customer premise.

11. The facility transport system according to claim 9, wherein said upstream transmission path utilizes carrierless amplitude modulation phase modulation/quadrature amplitude modulation (CAP/QAM) to transport said Ethernet frame data from said customer premise to said central office facility.

12. The facility transport system according to claim 9, wherein said switch means and said network element further comprise:

transmitter means for coupling to said copper infrastructure, said transmitter means is operative to encapsulate received Ethernet frame data into data frames and to generate a transmit signal therefrom suitable for transmission onto said copper infrastructure; and receiver means for coupling to said copper infrastructure, said receiver means is operative to de-encapsulate received data frames into Ethernet frame data and to generate a receive data signal therefrom.

13. The facility transport system according to claim 9, wherein said network element comprises a modem.

14. The facility transport system according to claim 9, wherein said network element comprises a customer premise local area network (LAN) switch.

15. A transport system for the transport of Ethernet frame data and plain old telephone service (POTS) voice signals over a copper infrastructure connecting a central office facility to a customer premise, comprising:

a private branch exchange (PBX) coupled to said central office facility and operative to receive and transmit voice signals between said central office facility and said customer premise;

a local area network (LAN) coupled to said central office facility and operative to receive and transmit Ethernet data signals between said central office facility and said customer premise;

a first plurality of modems coupled to said LAN and operative to convert Ethernet data signals into analog 10BaseS signals;

a first plurality of splitters coupled to said first plurality of modems and operative to combine and split analog 10BaseS signals and POTS voice signals such that the output of each splitter is a combined voice and data signal;

a second plurality of splitters coupled to said first plurality of modems and operative to receive combined voice and data signals and split in into analog 10BaseS signals and POTS voice signals;

a second plurality of modems coupled to said second plurality of splitters an operative to convert analog 10BaseS signals to Ethernet data signals for transmission to one or more network elements;

a plurality of voice telephone devices coupled to said second plurality of splitters, said plurality of voice telephone devices operative to communicate with said PBX;

wherein Ethernet data is transmitted in both directions between said LAN and said plurality of network elements at a symmetrical data rate;

wherein Ethernet data and POTS voice signals are combined and simultaneously transmitted between said first plurality of splitters and said second plurality of splitters.

* * * * *